July 3, 1956  J. S. TANNER  2,752,700
SOIL THROWING PADDLE WHEEL ARRANGEMENT FOR PLOW TYPE DITCHER
Filed June 8, 1951  3 Sheets-Sheet 3
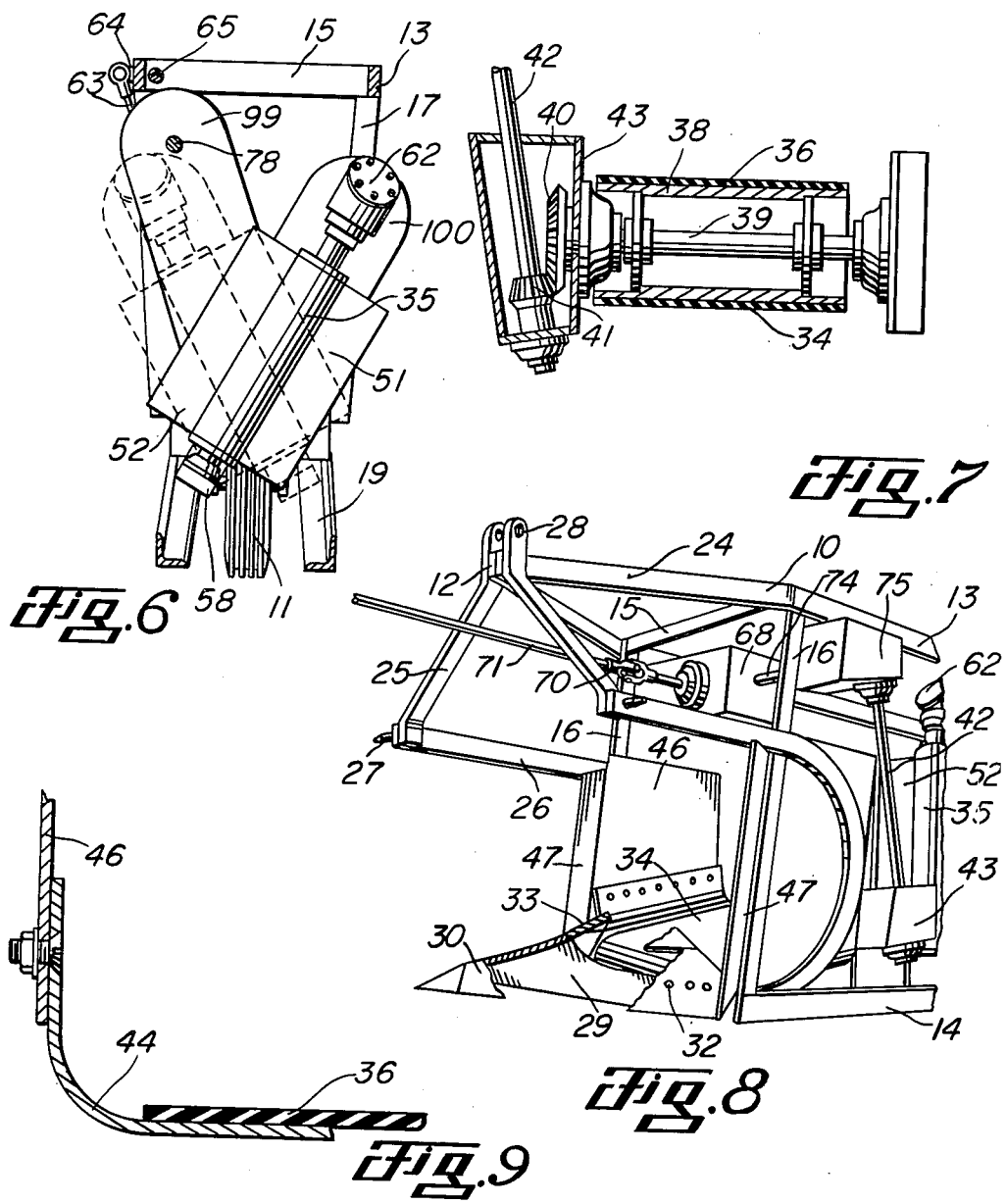
John S. Tanner
INVENTOR
BY Ahley & Ahley
ATTORNEYS

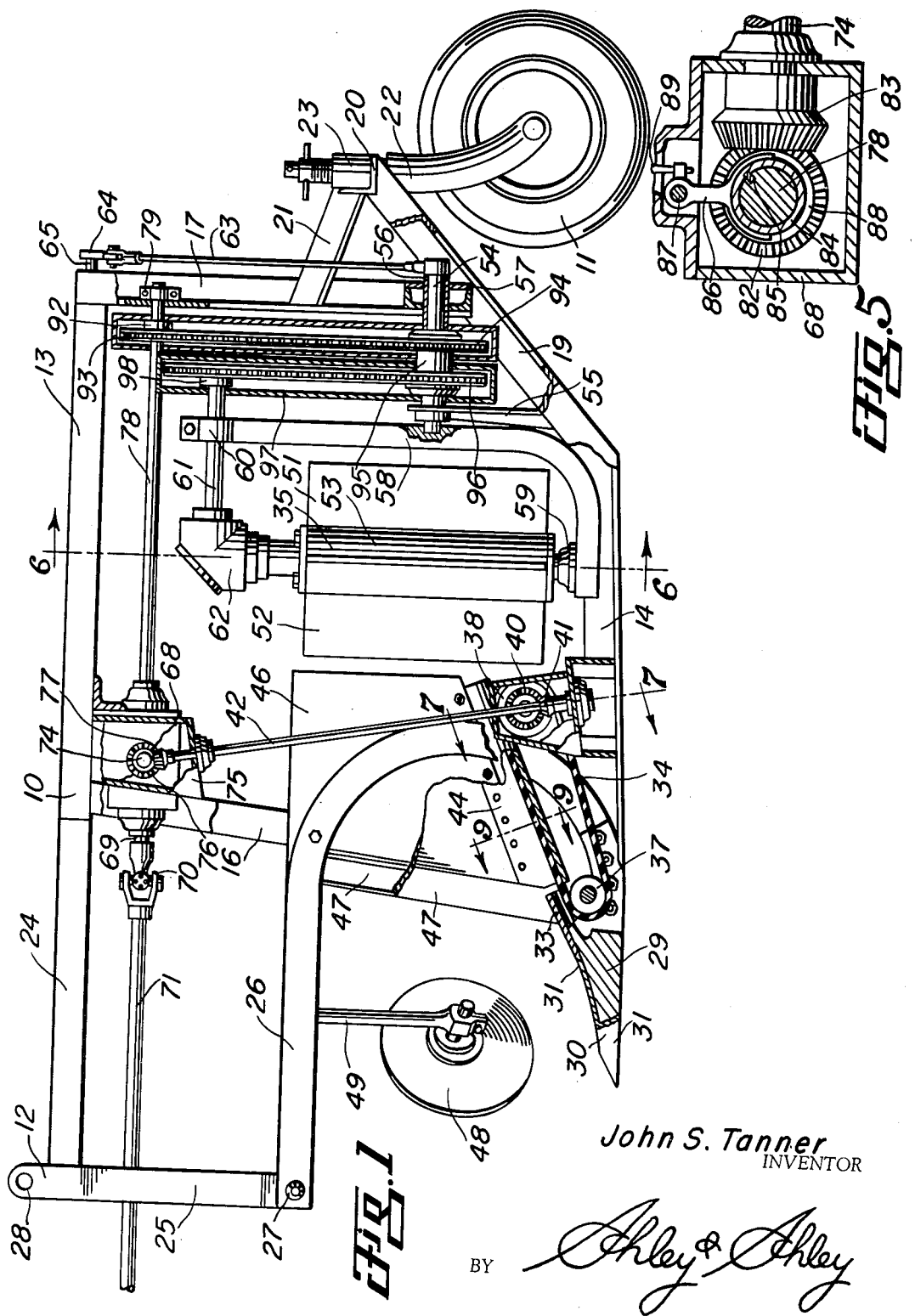

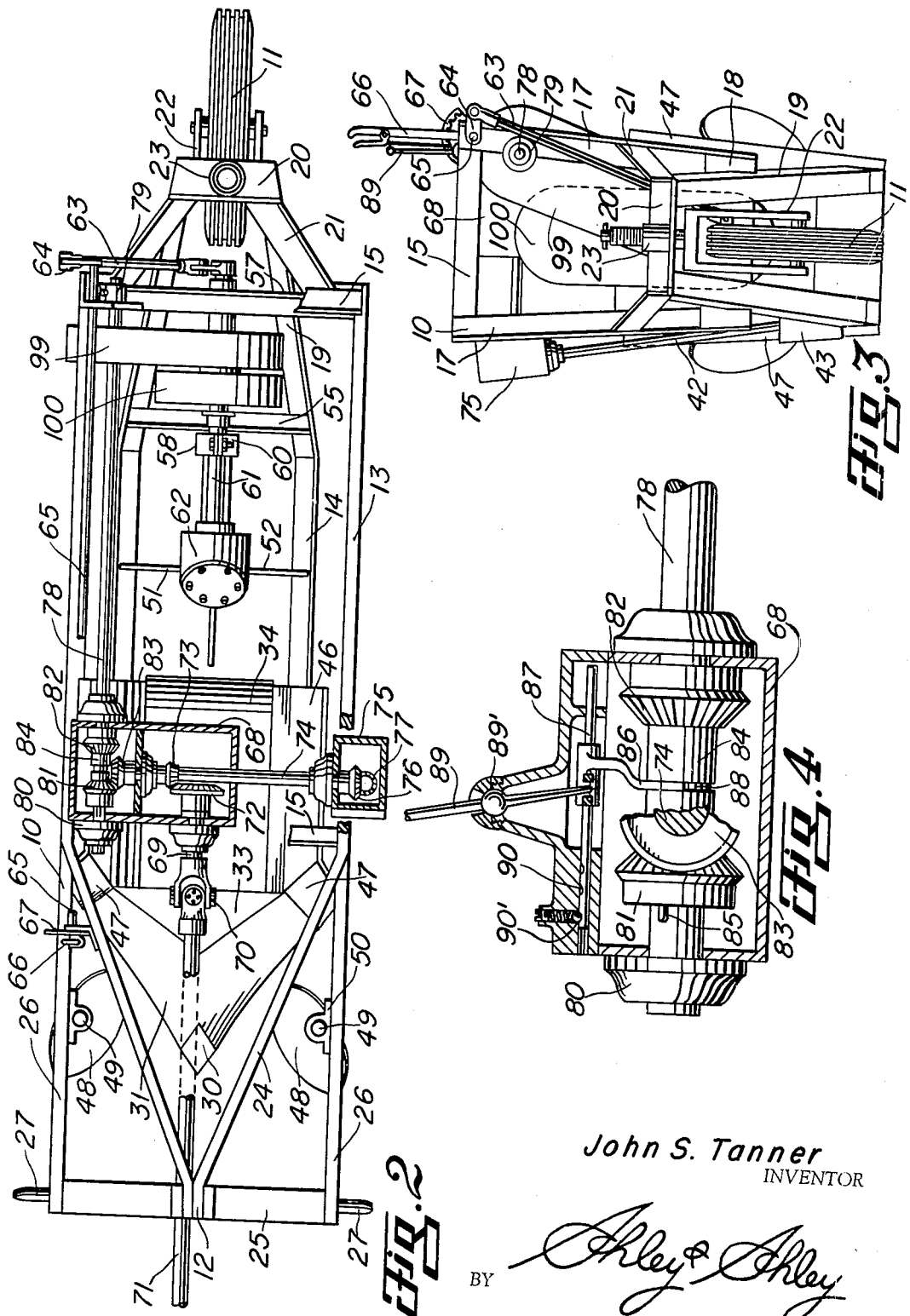

United States Patent Office 2,752,700
Patented July 3, 1956

2,752,700

SOIL THROWING PADDLE WHEEL ARRANGEMENT FOR PLOW TYPE DITCHER

John S. Tanner, Dallas, Tex.

Application June 8, 1951, Serial No. 230,625

7 Claims. (Cl. 37—99)

This invention relates to new and useful improvements in soil moving implements.

One object of the invention is to provide an improved soil moving implement of such construction as to be particularly adapted for use in forming drainage ditches and in building terraces to control and prevent soil erosion.

A particular object of the invention is to provide an improved soil moving implement adapted to cut a deep furrow or ditch and to throw the loose soil laterally a predetermined distance away from the furrow or ditch in either direction whereby an erosion control terrace may be formed at a desired location or whereby the implement is adaptable to sub-soil plowing in arid areas.

An important object of the invention is to provide an improved soil moving implement having soil cutting and elevating means and soil throwing means for receiving and throwing the loose soil upward and laterally, the latter means being readily reversible for throwing the soil to either side and adjustable for varying the distance said soil is thrown.

Another object of the invention is to provide an improved soil moving implement, of the character described, wherein the soil throwing means includes a paddle wheel rotatable about an upright axis and supported for pivotal adjustment about a substantially longitudinal axis whereby a predetermined distance of throw may be obtained by tilting the wheel about its pivotal support.

A further object of the invention is to provide an improved implement, of the character described, having a plow and means for directing or conducting the soil from the plow to the throwing means whereby substantially all of the loose soil is removed from the furrow or ditch and is prevented from falling thereinto.

Still another object of the invention is to provide an improved implement, of the character described, which includes upright cutter elements adjacent the plow for cutting soil from the side walls of a ditch or furrow and directing the soil to the conducting means whereby the implement may be used in forming relatively deep ditches or furrows.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a side elevational view, partly in section, of a soil moving implement constructed in accordance with the invention, Fig. 2 is a plan view, partly in section, of the implement, Fig. 3 is a rear elevation of the implement, Fig. 4 is an enlarged, perspective view of the means for shifting the direction of rotation of the soil throwing member, Fig. 5 is a transverse, vertical, sectional view of the shifter means, Fig. 6 is a transverse, vertical, sectional view, taken on the line 6—6 of Fig. 1, and showing the soil throwing member swung to an inclined position, Fig. 7 is a transverse, sectional view, taken on the line 7—7 of Fig. 1, and showing the drive arrangement of the conveyor, Fig. 8 is a perspective view of forward portion of the implement, and Fig. 9 is a transverse, vertical, sectional view, taken on the line 9—9 of Fig. 1.

In the drawings, the numeral 10 designates the frame of a soil moving implement which is supported by a rear trailer or furrow wheel 11 of the caster type and which is adapted to be attached to the drawbar and lifting member of a tractor (not shown) by a hitch 12. The frame 10 is substantially rectangular and includes upper and lower longitudinal bars or beams 13 and 14. Cross bars or members 15 connect the upper beams 13 and substantially upright bars 16 extend between and connect the forward ends of said longitudinal beams and lower beams 14. Similar upright bars 17, of less length, depend from the rear ends of the upper beams and have their lower ends attached by a transverse channel bar 18. As is most clearly shown in Figs. 1, 2 and 3, the longitudinal beams are parallel and the lower beams are disposed inwardly of the upper beams. Thus, the upright bars 16 and 17 are inclined inwardly and downwardly so as to be downwardly convergent and the frame is of downwardly decreasing width. The lower beams are of less length than and are disposed a slight distance forwardly of the upper beams, whereby the front bars 16 are inclined slightly forwardly and downwardly and the rear ends of said lower beams terminate forwardly of the rear upright bars 17 and their connecting channel bar 18.

Inclined, rearwardly-converging bars 19 extend upwardly from the rear ends of the lower beams for supporting the channel bar and the trailer wheel 11. A cross bar or member 20 connects the rear, upper ends of the inclined bars 19 and similar upwardly and forwardly inclined bars 21 extend from the cross member to the intermediate portions of the upright bars 17. The wheel 11 is suspended from the cross member 20 by means of a conventional fork 22 which is adjustably and rotatably supported in a collar 23 carried by said cross member. Due to this mounting, the wheel is free to pivot about the axis of the collar 23 and its elevation may be adjusted to raise and lower the rear end of the frame. As shown in Fig. 1, it is preferable to slightly incline the lower longitudinal beams upwardly toward the inclined bars 19.

Forwardly-converging extensions 24 project from the upper longitudinal beams 13 forwardly of the bars 16 for connection with the upper end portion of the hitch 12. The latter is yoke-shaped and has the lower ends of its depending arms or legs 25 fastened to the forward ends of plow-supporting beams or members 26. A pivot pin 27 projects laterally from the forward end of each beam 26 for connection with the tractor drawbar and the upper end of each leg 25 has an opening 28 for connection with the usual lifting mechanism (not shown) of the tractor. However, the hitch may be omitted when the implement is used with small tractors since it is not necessary to lift said implement. The beams 26 are disposed externally of the upright bars 16 and are curved downwardly and inwardly, whereby their lower ends are directed forwardly and inwardly, and are connected and reinforced by a plow-supporting bracket or yoke 29. A plow 30, of the middlebreaker type having inclined, relatively flat, moldboard portions 31, is attached to the bracket 29 by suitable means, such as the bolts and nuts 32. The moldboard portions 31 are arranged to direct the soil rearwardly and a triangular plate or extension 33 is secured to their inner, rear margins for closing the usual opening between said portions and preventing the soil cut and lifted by the plow from falling to the ground.

A conveyor 34 is mounted behind the plow 30 and is upwardly and rearwardly inclined for receiving and directing the soil to a rotatable soil throwing member 35. The conveyor 34 includes an endless belt 36 mounted upon transverse rollers 37 and 38 which are suitably supported by the frame. As is clearly shown in Fig. 1, the roller 37 is of less diameter than the roller 38 and is positioned beneath the plate 33 of the plow in spaced relation to the bottom of the frame. Each roller includes an axle and the axle 39 of the rear roller 38 has a bevelled gear 40 mounted upon one end thereof for meshing with a complementary pinion 41 carried by the lower portion of an upright shaft 42 (Fig. 7). A suitable housing 43 encloses the gear 40 and pinion 41. For supporting the upper flight of the conveyor belt 36, a suitable angular plate or bracket 44 is provided and has upwardly-directed flanges 45 at its longitudinal margins for attachment to the lower edge portions of upright guard or deflector plates 46. The forward edge portions of the guard plates 46 are secured to the inner surfaces of the upright bars 16 and said plates extend longitudinally substantially throughout the length of the conveyor. Manifestly, the soil is confined and prevented from transverse displacement by the plates. Elongate, flat cutter blades or elements 47 extend longitudinally of the upright bars 16 from the forward edges of the plates 46 to the rear edges of the moldboard portions 31. Thus, the cutter blades 47 are inclined forwardly, downwardly and outwardly for cutting the side walls of a ditch or furrow and direct the soil toward the conveyor so as to coact with the plow in cutting a relatively deep ditch or furrow.

An adjustable disc blade 48 may depend from the forward, horizontal portion of each beam 26 for cutting dead stalks and trash and for coacting with the blades 47 in cutting the side walls of deep ditches or furrows. Each disc blade 48 is adjustably supported by an angular axle or spindle 49 which is clamped to the plow beam by a suitable bracket 50. Since the disc blades are adapted to break up hard soil, the use of the same is optional.

The soil throwing member 35 includes an upright paddle wheel 51 having a plurality of radial, longitudinal blades 52 which are preferably flat and which are mounted upon an axial hub or sleeve 53. For supporting the paddle wheel 51, a longitudinal shaft 54 is disposed rearwardly of said wheel and has its end portions journaled in a bracket 55 projecting upwardly from the inclined bars 19 and a sleeve 56 mounted in and extending through the channel bar 18. A flat plate or bar 57 closes the rear open end of the channel bar to reinforce the same and support the sleeve 56. The forward end of the shaft 54 projects through the bracket 55 and has an upright, angular bracket or hanger 58 fastened thereto with its lower portion extending forwardly beneath the paddle wheel. A suitable bearing box 59 is mounted on the forward underlying end portion of the hanger 58 for rotatably supporting the lower end of the paddle wheel. Since the details of the mounting of the paddle wheel are more or less conventional, the same have not been illustrated. The upper end of the hanger projects above the paddle wheel and carries a clamp 60 in which a drive shaft 61 is journaled. A right-angle gear box 62, the usual meshing, bevelled gears of which are not shown, is disposed between and drivingly connects the shaft 61 to the paddle wheel. Also, the gear box 62 rotatably supports the upper end of the wheel and the forward end of the shaft. Due to this arrangement, the entire soil throwing member 35, including the paddle wheel 51, hanger 58, shaft 61 and gear box 62, is pivotally supported by the shaft 54 and is adapted to be swung in a vertical arc about the longitudinal axis of said latter shaft.

An upright lever 63 is attached to the rear projecting end of the shaft 54 for turning the same about its axis to swing or pivot the member. The lever 63 is pivotally connected to a link 64 mounted on the rear end of a rod 65 which extends longitudinally of the frame. As is most clearly shown in Figs. 2 and 3, a hand lever 66 is mounted on the forward end of the rod 65 for imparting pivotal or swinging movement to the soil throwing member and is arranged to coact with a ratchet sector 67 for holding said member in adjusted positions. Manifestly, swinging movement of the lever 66 rotates the rod 65 upon its axis and pivots the link 64 to reciprocate the lever 63 and rotate the shaft 54 about its axis. Thus, the soil throwing member is pivoted or tilted about the axis of the shaft 54 whenever the hand lever is swung. As will be explained, the distance to which the soil is thrown by the member may be varied by adjusting the position of said member and said distance is increased by pivoting or tilting the member from its upright or vertical position.

For driving the conveyor 34 and the soil throwing member, a gear housing 68 is suitably mounted on the upper forward portion of the frame and has a stub shaft 69 extending through its forward wall. The shaft 69 is adapted to be connected by a universal joint 70 and a suitable drive shaft 71 to the power take-off of the tractor, which is not illustrated. A bevelled gear 72 is mounted on the rear end of the shaft 69 and is in constant mesh with a complementary pinion 73 mounted upon a transverse shaft 74. One end of the shaft 74 projects through the inner side wall of the gear housing 68 and extends into a lateral gear box 75 disposed substantially above the gear box 43. The upper end of the upright shaft 42 extends through the bottom of the gear box 75 and has a bevelled pinion 76 mounted thereon for meshing with a complementary gear 77 on the end of the shaft 74. Thus, rotation imparted to the shaft 69 is transmitted through the shafts 74 and 42 to the axle 39 of the roller 38 for driving the conveyor 34.

For rotating the soil throwing member, a shaft 78 extends longitudinally of the upper portion of the frame and has its rear end journaled in a suitable bearing box 79 which is mounted upon one of the rear upright bars 17. The forward end of the shaft 78 extends through the gear casing and is journaled in a bearing box 80 mounted on the forward wall of said housing. Bevelled pinions 81 and 82 are carried by the portion of the shaft within the gear housing for meshing with a bevelled pinion 83 mounted on the end of the transverse shaft 74. The pinions 81 and 82 are adapted to be selectively engaged with the pinion 83 whereby the shaft 78 may be rotated in opposite directions. As is most clearly shown in Figs. 4 and 5, the pinions 81 and 82 are carried by a collar or sleeve 84 which is slidably mounted on the shaft 78 by means of a key 85, whereby the collar and its pinions are rotatable with and movable longitudinally of said shaft. For imparting relative longitudinal movement to the collar 84 and its pinions, a transverse shifter element or fork 86 is carried by a longitudinally slidable pin 87, extending parallel to the shaft, and has its jaw engaging in an annular groove 88 formed in the periphery of said collar intermediate its pinions. A suitable lever 89 projects through the upper wall of the gear casing and has connection with the fork 86, whereby the collar and its pinions may be moved longitudinally of the shaft by manual movement of the lever, pin and fork. The lever 89 is supported in a conventional socket mounting 89'.

A plurality of notches or recesses 90, preferably three in number, are formed in the slidable pin 87 for receiving and coacting with a spring-pressed pawl or detent 90' to hold the fork and the collar 84 with its pinions in adjusted positions. Manifestly, the pinion 81 meshes with the pinion 83 when the rear notch 90 is engaged with the detent 90', while engagement of the forward notch with said detent maintains the pinion 82 in mesh with said pinion 83. Thus, the shaft 78 may be rotated in a clockwise or counter-clockwise direction and the direction of rotation may be readily reversed by swinging the lever 89. If desired, the intermediate notch may be provided for holding the collar in an intermediate position with both of its pinions out of mesh with the pinion 83.

The rear end portion of the shaft 78 has driving connection with the shaft 61 for imparting rotation to the paddle wheel 51. A sprocket 92 is fixed on the shaft 78 and is connected by a chain 93 to a sprocket 94 journaled on the shaft 54 by means of a collar or sleeve 95. The collar 95 carries a second sprocket 96 which is connected by an endless chain 97 to a sprocket 98 mounted on the shaft 61. Due to this arrangement, rotation of the shaft 78 is transmitted by the sprockets 92 and 94 and the chain 93 to the collar 95 and then through the sprockets 96 and 98 and the chain 97 to the shaft 61. Thus, the paddle wheel is driven by rotation of the shaft 78 and the direction of rotation is reversed upon reversing the direction of rotation of said shaft. Suitable chain cases 99 and 100 preferably enclose the sprockets and chains.

The operation will be apparent from the foregoing description. The conveyor 34 is constantly driven in a clockwise direction whenever the shafts 69 and 71 are operatively connected to the power take-off of the tractor. The rotation of the paddle wheel 51 is dependent upon meshing engagement of one of the pinions 81 and 82 with the pinion 83. Whenever it is desired to reverse rotation of the paddle wheel, the shaft 71 is operatively disconnected from the power take-off to halt rotation of the transverse shaft 74 and its pinion 83. The collar 84 is then moved longitudinally of the shaft 78 by means of the shifter fork 86 to disengage one of its pinions and engage its other pinion with the pinion 83. Upon subsequent rotation of the shaft 71, the direction of rotation of the paddle wheel is reversed.

The plow 30 is adapted to cut a ditch or furrow and the conveyor is arranged to receive and conduct the soil lifted by said plow to the soil throwing member 35. The cutter blades 47 are designed to cut soil from the side walls of the ditch or furrow and coact with the guard plates 46 in directing the soil to the conveyor. It is noted that the cutter blades are particularly advantageous when a relatively deep furrow or ditch is desired. The disc blades 48 coact with the cutter blades in cutting and breaking up hard soil and function to cut dead stalks and trash. Obviously, the soil throwing member is adapted to receive soil from the conveyor and throw the same laterally of the direction of travel of the implement. When the paddle wheel 51 is rotated in a clockwise direction (Fig. 2), the soil is thrown to the right and reverse rotation of said wheel throws the soil to the left of the direction of travel. By pivoting or tilting the soil throwing member, the distance and elevation to which the soil is thrown may be increased or varied. As has been explained, the member 35 may be pivoted or tilted by swinging the hand lever 67. As shown in Fig. 6, the chain case 100 is movable with the soil throwing member, while the chain case 99 remains stationary. Due to the pivotal mounting and reversibility of the soil throwing member, it is manifest that the implement is particularly adapted for use in forming drainage ditches and erosion-control terraces as well as deep or sub-soil plowing. The distance and direction of throw permit the use of the implement on either or both sides of a desired terrace and at varying distances from the terrace. It is noted that the blades 52 of the paddle wheel extend below the upper flight of the conveyor, whereby said blades are not moved out of the path of the soil discharged by said conveyor when said wheel is pivoted or tilted.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a soil moving implement, a frame, an upright soil throwing member journaled on the frame and having longitudinal blades rotatable about a substantially upright axis, means carried by said frame for delivering soil to the blades, drive means carried by said frame for rotating said soil throwing member, means mounted on said frame supporting the throwing member constantly in the path of the soil delivered to its blades and for pivotal movement about an axis longitudinal to the implement and adjacent the lower end of said member, and means on said frame for pivoting the supporting means about its pivotal axis to tilt the throwing member laterally of said frame in the path of the delivered soil and selectively vary the distance to which the soil is thrown.

2. A soil moving implement including, a frame, plow means carried by the frame to cut and lift the soil, an upright rotatable soil throwing member having elongated longitudinal blades carried by the frame in the path of the soil lifted by the plow means for striking and throwing the soil laterally relatively to the direction of travel of the implement, the throwing member being pivotally supported adjacent its lower end on said frame for movement about an axis longitudinal to said frame and rearwardly of said plow means so as to be capable of being swung laterally to tilted positions in the path of the soil lifted by said plow means to vary the distance to which the soil is thrown, and means on the frame for holding said throwing member in tilted positions.

3. A soil moving implement including, a frame, plow means carried by the frame to cut and lift the soil, an upright rotatable soil throwing member having elongated longitudinal blades carried by the frame in the path of the soil lifted by the plow means for striking and throwing said soil laterally relatively to the direction of travel of the implement, the throwing member being rotatable about a substantially upright axis and pivotally supported adjacent its lower end on said frame for movement about an axis longitudinal to said frame and rearwardly of said plow means for lateral swinging movement to tilted positions in the path of the soil lifted by said plow means, and means on said frame for swinging said throwing member about its pivotal axis to tilt said member laterally of said frame and constantly in the path of the soil lifted by the plow means and to selectively vary the distance to which the soil is thrown.

4. A soil moving implement including, a main frame, plow means carried by the frame to cut and lift soil, an upright soil throwing member mounted on the frame for rotation about a substantially upright axis, the member having elongate longitudinal blades and disposed rearwardly of the plow means in the path of the lifted soil, drive means for rotating said member so that its blades strike and throw lifted soil laterally of the direction of travel of the implement, a sub-frame pivotally connected to said frame to support said throwing member adjacent its lower end for swinging movement about an axis longitudinal to said main frame and constantly in the path of the lifted soil, means for swinging the sub-frame about its axis transversely of said main frame so as to swing said throwing member to tilted positions in the path of the lifted soil and selectively vary the distance to which said soil is thrown.

5. A soil moving implement as set forth in claim 4 including, means on the main frame holding the swinging means in adjusted positions to hold the sub-frame and throwing member in adjusted positions.

6. A soil moving implement including, a portable frame, plow means carried by and disposed longitudinally of the frame to cut and lift and deliver soil rearwardly, substantially upright rotatable soil throwing means suspended from said frame rearwardly of the plow means and directly in the path of the soil delivered by the plow means, said throwing means having elongated longitudinal soil throwing elements extending above and below the path of the delivered soil, drive means carried by said frame for rotating said throwing means about a substantially upright axis whereby said throwing means strikes and throws the delivered soil laterally of the direction of travel of the implement, said throwing means being pivotally supported adjacent its lower end about an axis longitudinal to said frame and movable to lateral positions for tilting in the direct path of the delivered soil to vary the distance to which the soil is thrown.

7. A soil moving implement including, a portable frame adapted to be attached to and actuated by a prime mover, plow means carried by and disposed longitudinally of the frame to cut and lift and deliver soil rearwardly, rotatable throwing means suspended from said frame and having substantially upright throwing elements constantly in the path of the delivered soil, upright supporting means for the throwing means pivoted adjacent its lower end for movement transversely of said frame about an axis longitudinally of the direction of travel of the implement, drive means carried by the supporting means for rotating said throwing means, and motion transmitting means carried by said frame and attachable to the prime mover and including an element movable with the supporting means separately of other elements of the motion transmitting means.

References Cited in the file of this patent

UNITED STATES PATENTS

| | | |
|---|---|---|
| 915,110 | Pickel | Mar. 16, 1909 |
| 1,767,017 | Scheckler | June 24, 1930 |
| 2,063,584 | Collins | Dec. 8, 1936 |
| 2,079,595 | Collins | May 11, 1937 |
| 2,510,779 | Hancock | June 6, 1950 |
| 2,542,474 | Burckett | Feb. 20, 1951 |

FOREIGN PATENTS

| | | |
|---|---|---|
| 117,907 | Great Britain | Aug. 15, 1918 |
| 652,179 | Great Britain | May 7, 1948 |